(12) United States Patent
Myles

(10) Patent No.: US 8,141,162 B2
(45) Date of Patent: *Mar. 20, 2012

(54) METHOD AND SYSTEM FOR HIDING INFORMATION IN THE INSTRUCTION PROCESSING PIPELINE

(75) Inventor: Ginger Marie Myles, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 967 days.

This patent is subject to a terminal disclaimer.

(21) Appl. No.: 11/923,664

(22) Filed: Oct. 25, 2007

(65) Prior Publication Data

US 2009/0113553 A1    Apr. 30, 2009

(51) Int. Cl.
    G06F 7/04    (2006.01)
(52) U.S. Cl. .................... 726/26; 713/150; 712/226
(58) Field of Classification Search ............ 726/26; 713/150; 712/226
    See application file for complete search history.

(56) References Cited

U.S. PATENT DOCUMENTS

| | | | |
|---|---|---|---|
| 5,559,884 | A | 9/1996 | Davidson et al. |
| 6,209,126 | B1 * | 3/2001 | Sasaki et al. ................. 717/125 |
| 7,051,208 | B2 | 5/2006 | Venkatesan et al. |
| 2003/0101336 | A1 * | 5/2003 | Kosche et al. ................. 712/244 |
| 2004/0184612 | A1 * | 9/2004 | Kohiyama et al. ............ 380/217 |
| 2005/0108507 | A1 | 5/2005 | Chheda et al. |
| 2005/0210275 | A1 | 9/2005 | Homing et al. |
| 2006/0195906 | A1 | 8/2006 | Jin et al. |
| 2007/0113056 | A1 | 5/2007 | Dale et al. |
| 2008/0184019 | A1 * | 7/2008 | Sheikh et al. ................. 712/244 |
| 2008/0313653 | A1 * | 12/2008 | Malone et al. ................. 719/319 |
| 2010/0017625 | A1 * | 1/2010 | Johnson et al. ............... 713/190 |

OTHER PUBLICATIONS

Anckaet et al., "Steganography for Executables and Code Transformation Signatures," in Proceedings of Information Security and Cryptology, ICISX 2004, pp. 425-439, 2005.
Collberg et al., "Dynamic Path-Based Software Watermarking," in Proceedings of PLDI, 2004.
Collberg et al., "Software Watermarking: Models and Dynamic Embeddings," in Proceedings of ACM Symposium on Principles of Programming Languages, 1999.
Cousot et al., "An Abstract Interpretation-Based Framework for Software Watermarking," in Proceedings of ACM Symposium on Principles of Programming Languages, 2004.
El-Khalil et al., "Hiding Information in Program Binaries," in Proceedings of the 6th Intl. Conf. on Information and Communications Security (ICICS), pp. 187-199, 2004.

(Continued)

*Primary Examiner* — Nabil El Hady
(74) *Attorney, Agent, or Firm* — Cantor Colburn LLP; Mohammed Kashef

(57) ABSTRACT

A system, article of manufacture and method is provided for transferring secret information from a first location to a second location. The secret information is encoded and stalls in executable code are located. The executable code is configured to perform a predetermined function when executed on a pipeline processor. The encoded information is inserted into a plurality of instructions and the instructions are inserted into the executable code at the stalls. There is no net effect of all of the inserted instructions on the predetermined function of the executable code. The executable code is transferred to the second location. The location of the stalls in the transferred code is identified. The encoded information is extracted from the instructions located at the stalls. The encoded information may then be decoding information to generate the information at the second location.

1 Claim, 5 Drawing Sheets

OTHER PUBLICATIONS

Myles et al., "Self-Validating Branch-Based Software Watermarking," in Proceedings of Information Hiding Workshop, pp. 342-356, 2005.

Nagra et al., "Threading Sofware Watermarkings," In Proceedings of Information Hiding Workshop, 2004.

Simmons, "The Prisoners' Problem and the Subliminal Channel," in Advances in Cryptology, pp. 51-67, 1984.

Stem et al., "Robust Object Watermarking: Application to Code," in Proceedings of Information Hiding Workshop, pp. 368-378, 1999.

Swaminathan et al., "Data Hiding in Compiled Program Binaries for Enhancing Computer System Performance," in Proceedings of Information Hiding Workshop, pp. 357-371, 2005.

Venkatesan et al., "A Graph Theoretic Approach to Software Watermarking," in Proceedings of Information Hiding Workshop, 2001.

Final Office Action dated Aug. 19, 2011; for pending U.S. Appl. No. 12/131,077.

* cited by examiner

METHOD AND SYSTEM FOR HIDING INFORMATION IN THE INSTRUCTION PROCESSING PIPELINE

FIELD OF INVENTION

The present invention generally relates to computer implemented steganographic and watermarking techniques, and particularly to methods and systems for encoding secret information in arbitrary program binaries.

BACKGROUND

Steganographic and watermarking techniques have been used to hide ancillary information in many different types of media. Steganographic techniques are generally used when the purpose is to conduct some type of secret communication and stealth is critical to prevent the interception of the hidden message. Watermarking techniques are more appropriate where the primary concern is to protect the hidden information, the watermark, from damage or removal.

In steganography a classic model is known as the "prisoners' problem". One example of the prisoners' problem is a scenario where Alice and Bob are two prisoners sent to different cells. Any communication between them must go through a warden Wendy. Because the warden wants to ensure that they are not developing an escape plan, she will not allow encrypted messages or any other suspicious communication. Therefore, Alice and Bob must set up a subliminal channel to communicate their escape plan invisibly.

Based on this model, steganography works as follows. When Alice wants to send a secret message to Bob she first selects a cover-object c. The cover-object is some harmless message which will not raise suspicion. She then embeds the secret message m in the cover-object to produce the stego-object s. The stego-object must be created in such a way that Wendy, knowing only the seemingly harmless message s, will not be able to detect the presence of a secret in the cover-object c. Alice then transmits the message s over an insecure channel to Bob. Once received, Bob is able to decode the message m since he knows the embedding method and their shared secret key.

Steganography is useful in many applications, such as the prevention of piracy of media. When using still images, video, or audio as the cover media we are able to leverage limitations in the human visual and auditory systems. This has led to a plethora of research on digital steganography and watermarking. Unfortunately, when the cover medium is an executable program we are far more restricted as to the type of transformations we can apply. These restrictions have resulted in fewer techniques, most of which suffer from inadequate data rates and/or poor resistance to attack.

In contrast to image and sound steganography very little attention has been paid to code steganography. Most of the research directed at hiding information in executables has focused on providing piracy protection and thus has taken the form of software watermarking. A number of software watermarking techniques have been developed and proposed. Some software watermarking algorithms embed the watermark through an extension to a method's control flow graph. The watermark is encoded in a subgraph which is incorporated in the original graph. In other techniques, the instruction frequencies of the original program are modified to embed the watermark. A dynamic watermarking algorithm has been proposed which embeds the watermark in the structure of the graph, built on the heap at runtime, as the program executes on a particular input. Other proposed techniques are path-based and rely on the dynamic branching behavior of the program. To embed the watermark the sequence of branches taken and not taken on a particular input are modified. An abstract interpretation framework may also be used to embed a watermark in the values assigned to integer local variables during program execution. Other techniques leverage the ability to execute blocks of code on different threads. The watermark is encoded in the choice of blocks executed on the same thread. Also, a branch function may be used which generates the watermark as the program executes.

In addition to software watermarking, other techniques are aimed directly at code steganography. For example one technique draws on the inherent redundancy in the instruction set to encode a message by noting that several instructions can be expressed in more than one way. For example, adding a value x to a register can be replaced with subtracting −x from the register. By creating sets of functionally equivalent instructions, message bits can be encoded in the machine code. Two improvements on the equivalent instruction substitution technique have been proposed using alternative encoding methods. The first technique is based on the ordering of basic blocks. The chain of basic blocks is selected based on the bits to be encoded. The second technique operates on a finer granularity and relies on the ordering of the instructions within a basic block. One recent code steganography technique is suggested not as a method for transferring secret messages, but as a way to provide additional information to the processor. The information encoding is accomplished by modifying operand bits in the instruction. To ensure proper execution a look-up table is stored in the program header.

Each of the above techniques has certain disadvantages such as inadequate data rates and poor resistance to attack.

Accordingly, there is a need for methods and systems for providing hidden messages in executable programs which have acceptable data rates and are very resistant to attack.

SUMMARY OF THE INVENTION

To overcome the limitations in the prior art briefly described above, the present invention provides a method, computer program product, and system for hiding information in an instruction processing pipeline.

In one embodiment of the present invention a method for embedding information in a computer program comprises: identifying at least one location within the computer program where pipeline processing dependencies require a stall; and inserting an instruction in the location, the instruction containing at least a portion of the information.

In another embodiment of the present invention, a method of hiding information in the instruction processing pipeline of a computer program comprises: identifying at least one stall in the instruction processing pipeline; and filling the stall with an instruction that encodes a secret message, the instruction not altering the functionality of the computer program.

In a further embodiment of the present invention includes an article of manufacture for use in a computer system tangibly embodying computer instructions executable by the computer system to perform process steps for transferring information from a first location to a second location the process steps comprising: encoding the information; locating stalls in executable code, the executable code being configured to perform a predetermined function when executed on a pipeline processor; inserting the encoded information into a plurality of instructions; inserting the instructions into the executable code at the stalls, there being no net effect of all of the inserted instructions on the predetermined function of the executable code; transferring the executable code to the second location; identifying the location of the stalls in the transferred executable code; extracting the encoded information from the instructions located at the stalls; and decoding the encoding information to generate the information at the second location.

An additional embodiment of the present invention comprises a system for embedding a digital signature in executable code comprising: stall identifying unit for identifying the location of stalls within the executable code; and instruction insertion unit for inserting an instruction in a first of the locations, the instruction containing at least a first portion of a digital signature.

Various advantages and features of novelty, which characterize the present invention, are pointed out with particularity in the claims annexed hereto and form a part hereof. However, for a better understanding of the invention and its advantages, reference should be made to the accompanying descriptive matter together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION OF THE INVENTION

Figure 1:
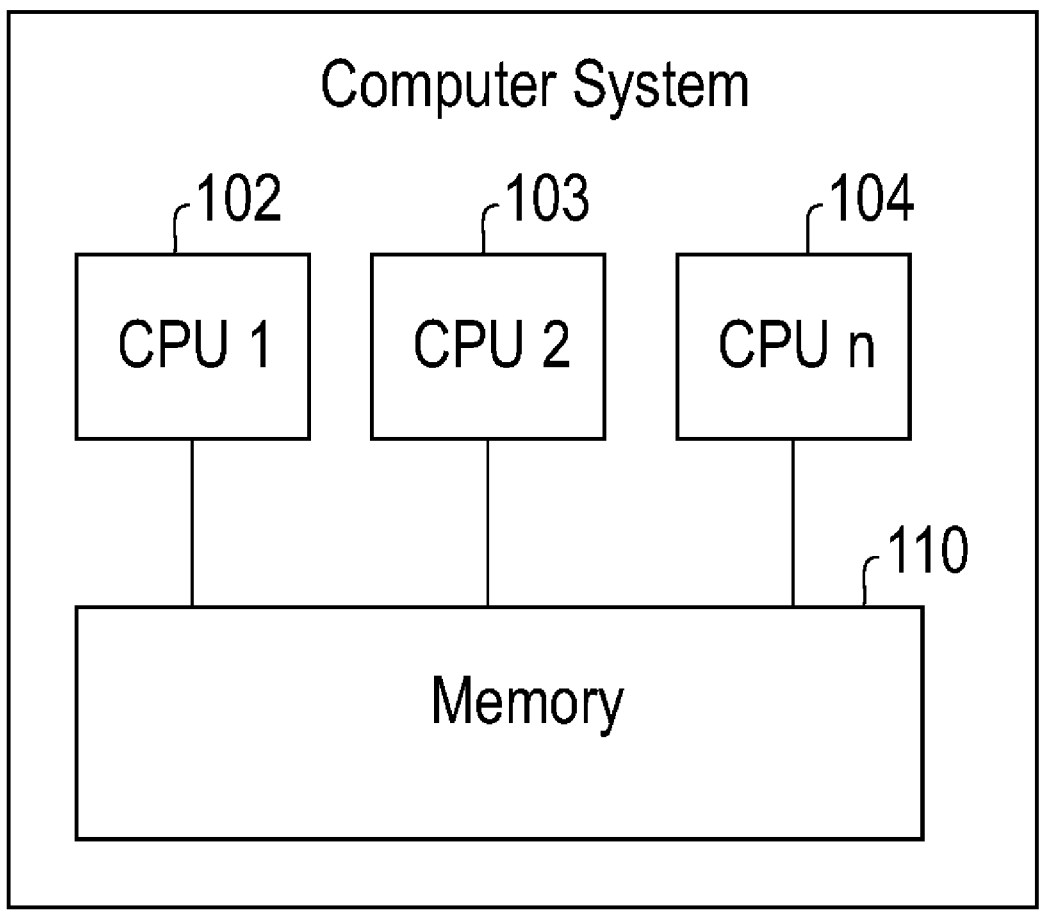
FIG. 1 is a block diagram of a typical computer system wherein the present invention may be practiced.

The present invention overcomes the problems associated with the prior art by teaching a system, computer program product, and method for hiding information in an instruction processing pipeline. In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The various elements and embodiments of invention can take the form of an entirely hardware embodiment, an entirely software embodiment or an embodiment containing both hardware and software elements. In a preferred embodiment, the invention may be implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 1 is a block diagram of a computer system 100, in which teachings of the present invention may be embodied. The computer system 100 comprises one or more central processing units (CPUs) 102, 103, and 104. The CPUs 102-104 suitably operate together in concert with memory 110 in order to execute a variety of tasks. In accordance with techniques known in the art, numerous other components may be utilized with computer system 100, such a input/output devices comprising keyboards, displays, direct access storage devices (DASDs), printers, tapes, etc. (not shown).

Although the present invention is described in a particular hardware embodiment, those of ordinary skill in the art will recognize and appreciate that this is meant to be illustrative and not restrictive of the present invention. Those of ordinary skill in the art will further appreciate that a wide range of computers and computing system configurations can be used to support the methods of the present invention, including, for example, configurations encompassing multiple systems, the internet, and distributed networks. Accordingly, the teachings contained herein should be viewed as highly "scalable", meaning that they are adaptable to implementation on one, or several thousand, computer systems.

The present invention provides a system and method of hiding information in an instruction processing pipeline. In particular, the present invention hides information in arbitrary program binaries. This is done by identifying stalls in the instruction processing pipeline. Instead of filling these stalls with no operation (nop) instructions the stalls are filled with instructions which will not adversely alter the functionality of the program, but which encode a hidden message.

The present invention can be used for secret communication or for watermarking/fingerprinting. It can also be used for encoding a digital signature of the executable code.

The present invention, in one embodiment, is a code steganographic technique that takes a message and an executable as input, and outputs a semantically equivalent executable which contains the secret message. To accomplish this, the present invention may analyze how the executable's instruction sequence would be processed in the instruction processing pipeline.

The present invention takes advantage of the manner in which the executable's instruction sequence is processed. Due to data dependencies between instructions it is not always possible to maintain a completely full instruction pipeline. These dependencies result in instruction stalls, often referred to as bubbles in the pipeline. Until the dependency can be resolved, the processing of a new instruction is stalled for x time units. The stall is generally accomplished by inserting x nops in the instruction sequence.

In accordance with the present invention, message encoding occurs by replacing those nop instructions with instructions that will not adversely alter the functionality of the program. Each instruction substitution may then represent a single bit, or some piece, of the secret message.

In one embodiment the present invention may be employed on Microprocessor without Interlocked Pipeline Stages (MIPS) Executable and Linking Format (ELF) executables. However, the principles of the present invention may be applicable to any pipeline architecture. The MIPS architecture is a useful example due to the relative simplicity of the instruction pipeline processing and the fixed length instruction set, which makes binary rewriting easier.

The embedding process itself is aided by the analysis that is normally performed during compilation. That is, when a program is compiled instruction scheduling analysis is performed, which identifies data dependencies. Depending on the specific level of optimization, when a dependency is found different actions take place. For an application compiled with optimization disabled, identification of a dependency results in the insertion of one or more nops in the instruction sequence. When optimization is enabled the compiler tries to reorder the instructions. Then if reordering fails the fall back is nop insertion.

As a result, the embedding process of the present invention may not require data dependency analysis, although it is possible to employ data dependency analysis as part of the embedding process. With nops already inserted as part of the conventional data dependence, in accordance with one embodiment of the invention, the instruction sequence may be scanned for nop instructions. When a nop is found it may be replaced with an instruction corresponding to the current message bit. The inserted instruction may be selected from an instruction codebook which may be constructed and shared with the intended message recipient prior to beginning the secret communication. Alternatively, the method for constructing the instruction codebook may be shared with the recipient prior to the secret communication.

Figure 2:
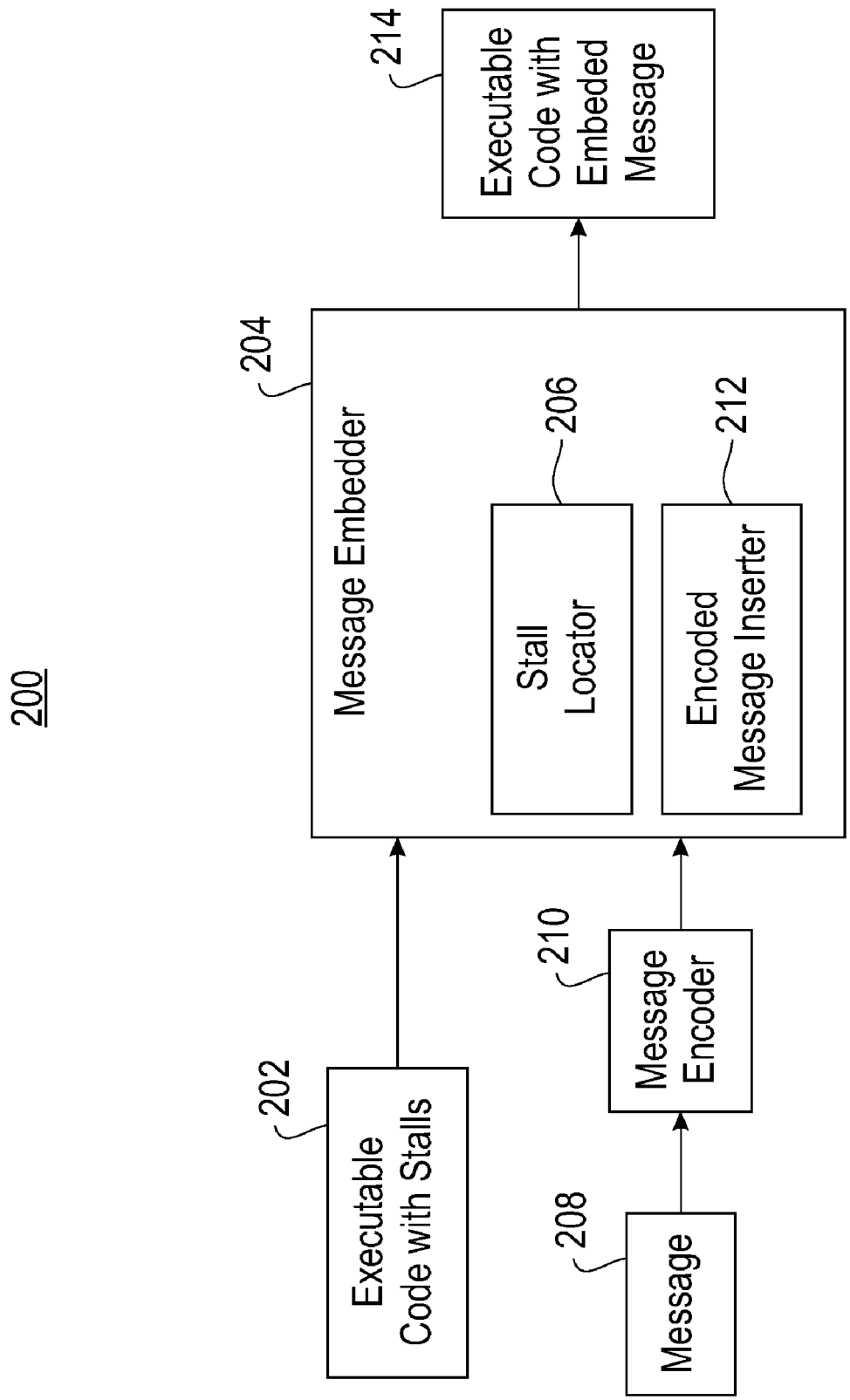
FIG. 2 shows a block diagram of a system for embedding a message in executable code in accordance with an embodiment of the invention.

FIG. 2 shows a block diagram of a message embedding system 200 for embedding information into an instruction processing pipeline in accordance with an embodiment of the invention. Executable code 202 is received by a message embedder 204. The message embedder 204 uses a stall locater module 206 for finding all the stalls in the code. In cases where dependency analysis has been done, the stall locator simply needs to locate the nops. In situations where the dependency analysis has not been done, the stall locator may do this analysis first before locating the stalls.

A secret message 208 is received by a message encoder 210, which converts the message into a form that is suitable for insertion into the executable code 202. For example, the message may be in human readable form, and the message encoder 210 may converts it into an encoded digital representation. In some embodiments, this encoded message may be encrypted using conventional encryption techniques. The encoded message is then received by the message embedder 204 where an insertion module 212 inserts the encoded message into the executable code in the locations where the nops were located. In particular, the nops are removed and an instruction containing the encoded message is inserted in its place. Generally, it will take several nops to represent the entire encoded message, so the insertion module 212 will separate the encoded message into sections that will be inserted into multiple nop locations. The result will be a version of the executable code 214 that performs the same as the original executable code 202, but now contains the hidden message. 208.

In should be noted that the insertion module 212 will insert instructions, which include parts of the encoded message, which will take the place of the nop instructions. The inserted instructions will be constructed so that they will have the same effect as a nop; that is, they will occupy one execution cycle without performing any operation. Alternatively, an inserted encoded message may comprise an instruction that actually does perform some operation, but a subsequent instruction will undo that operation so there will be no net effect. This approach may be preferred in some instances because it may make it more difficult for an unauthorized person to detect the locations of the instructions containing the encoded message.

Figure 3:
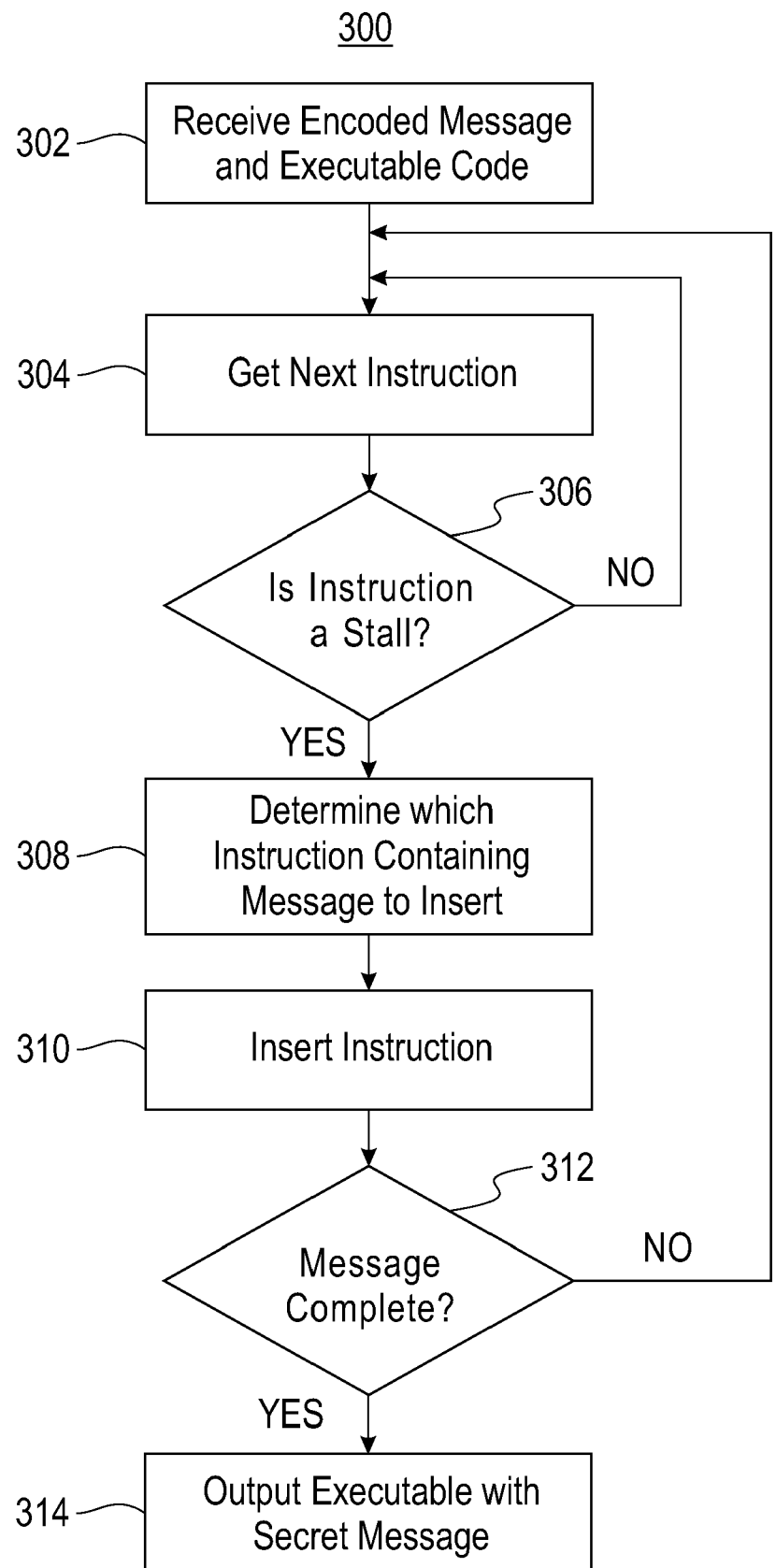
FIG. 3 shows a flow chart of a method of embedding a message in executable code in accordance with an embodiment of the invention.

FIG. 3 shows a flow chart of a process 300 for embedding a message in executable code in accordance with one embodiment of the invention. In step 302 the secret encoded message and the executable code are received, for example, by the message embedder 204. In step 304 the first and subsequent instructions are selected one at a time. Step 306 determines if a stall exists at this instruction. As discussed above, where dependency analysis has already been performed, this step may simply comprise determining if the selected instruction is a nop instruction. If it is not, the process returns to step 304 and the next instruction is selected.

If step 306 determines that the instruction is a stall, the process moves to step 308, which looks at the code book and at the message to determine which instruction to put in that location in the place of the nop. In step 310 the proper instruction message containing the correct portion of the secret message is inserted into the executable code. Step 312 then determines if the entire message has been embedded. If not, the process returns to step 304 and the next instruction is selected. If the entire message has been embedded then step 314 outputs the semantically equivalent, executable code containing the encoded message.

In many steganographic techniques it is often common to assume what is called a passive warden. This means that any person serving as an intermediary in the message exchange will read the message and possibly prevent it from being exchanged, but will not attempt to modify it. Because of this assumption, we can use a static embedding technique (one that only uses information statically available). Therefore, one possible method for selecting the nops is simply to replace them in the order that they appear in the executable.

However, in some applications, for example, where the present invention is used for watermarking purposes code modification attacks are a concern. Hence, in such applications a dynamic embedding technique may be preferred. One dynamic embedding technique that may be employed is to replace those nop instructions which reside on a particular execution path through the program instead of in the order that they appear in the executable. In this case, the program would be executed using a particular input sequence prior to embedding the secret message. As the program executes, the path through the program is recorded. Then, instead of selecting instruction as they appear in the static executable, we select instructions along the identified path through the program. To extract the watermark, the receiver will use the same input sequence to identify the path through the program. Then the message will be extracted from the instructions along that path. Since the embedded instructions are now linked to program execution it is more difficult to rearrange them. One of the keys to dynamic watermarking is that the input sequence used should remain secret; it basically serves the same purpose as a secret key in cryptography. Only the sender and the receiver should know the secret input sequence.

Figure 4:
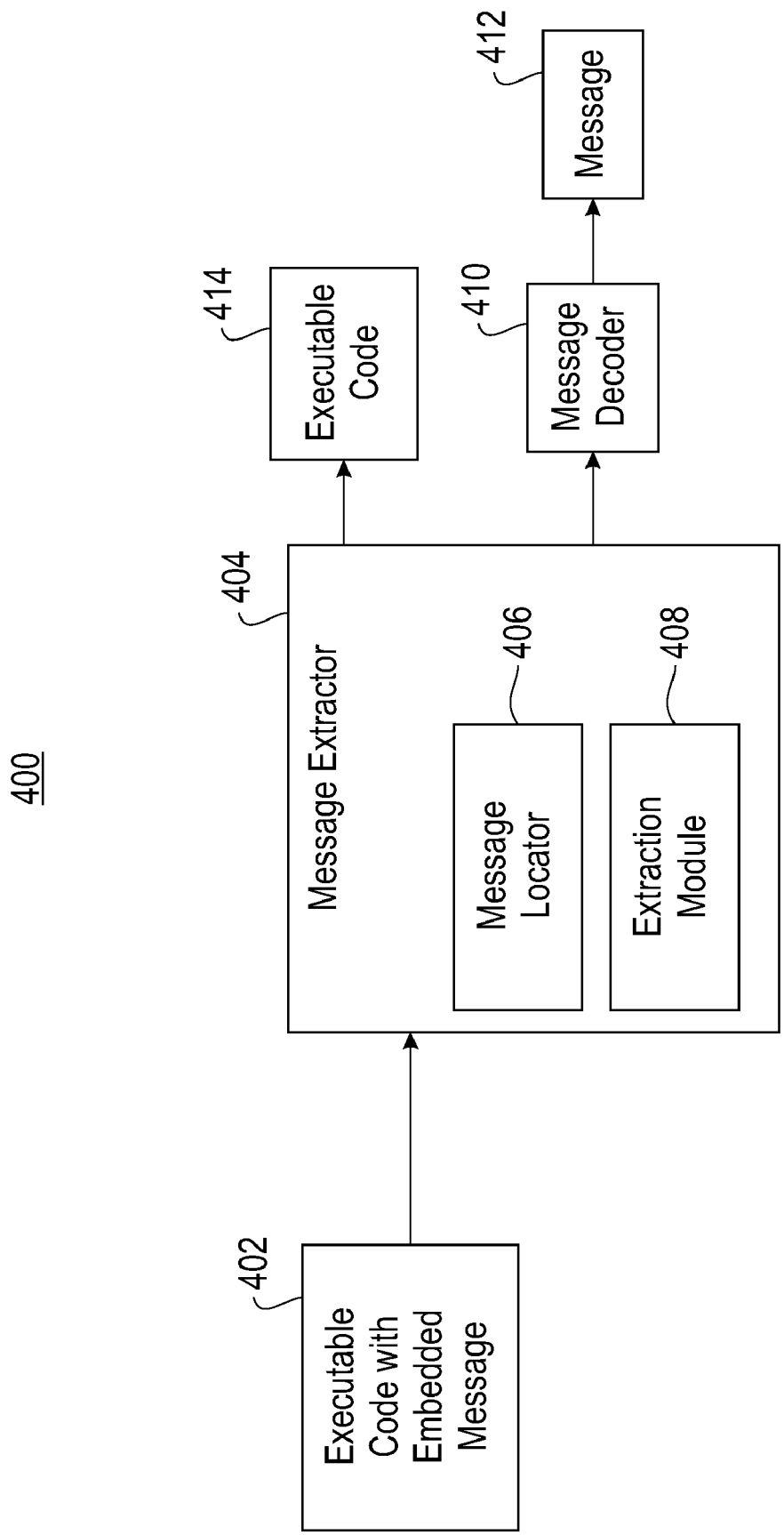
FIG. 4 shows a block diagram of a system for extracting the message embedded in the system shown in FIG. 2 in accordance with an embodiment of the invention.

FIG. 4 shows a block diagram of a message extraction system 400 in accordance with one embodiment of the invention. The executable code 402 with the secret encoded message embedded therein is received by a message extractor 402. Executable code 402 may comprise the executable code 214 with the embedded message shown in FIG. 2. Message locator module 406 will determine the location of the instructions containing the secret message. For example, message locator module 406 may do this by using information from a previously provided code book (not shown). The codebook may contain a list of all instructions used to encode part of the secret message and the value the instruction represents. For example, it could be comprised of (1) add eax, 0 represents 0 and (2) mul eax, 1 represents 1. Then each time the receiver saw one of these instructions in the executable he would check to see if it represented a stall, if so then he found a bit of the message. Without the codebook the receiver would not know which instructions could be part of the code or what value the instruction represented.

Extraction module 408 will next extract the message elements contained in each instruction found by the message locator module and assemble them into an encoded message. A message decoder 410 will then decode the message and generate the original message 412, which may be, in machine-readable or human-readable form. The message decoder 410 may use a conventional decryption technique that corresponds to the encryption technique used by the encoder 210 shown in FIG. 2. The executable code 414 has not been functionally altered by the message extraction system 400, so it may continue to be used for its original purpose, or may be used again to encode another secret message in accordance with the above-described techniques.

It may be noted that with information hiding techniques, it is harder to get the information out then it is to put it in. To extract the message the message locator 406 may simply scan the message looking for instructions which are known to represent bits of the message. This knowledge may come from the previously provided code book. However, it is possible that this technique could result in extraneous bits. To provide a more accurate message recovery, some embodiments of the invention may perform some data dependency analysis. That is, the message locator 406 may check to see if the removal of an identified instruction would result in a pipeline stall. If so, then the message extraction system 400 will decode the instruction to its corresponding bit, otherwise it will ignore the instruction.

An important parameter associated with code steganography techniques relates to the potential data rate. The resulting data rate achieved by the present invention will be determined by the number of stalls in the pipeline. Hence, it will be useful to analyze the executable code to determine the number of stalls available to receive parts of the secret message. In some cases this may be done by counting the number of nops and using this information to calculate a potential data rate.

Figure 5:
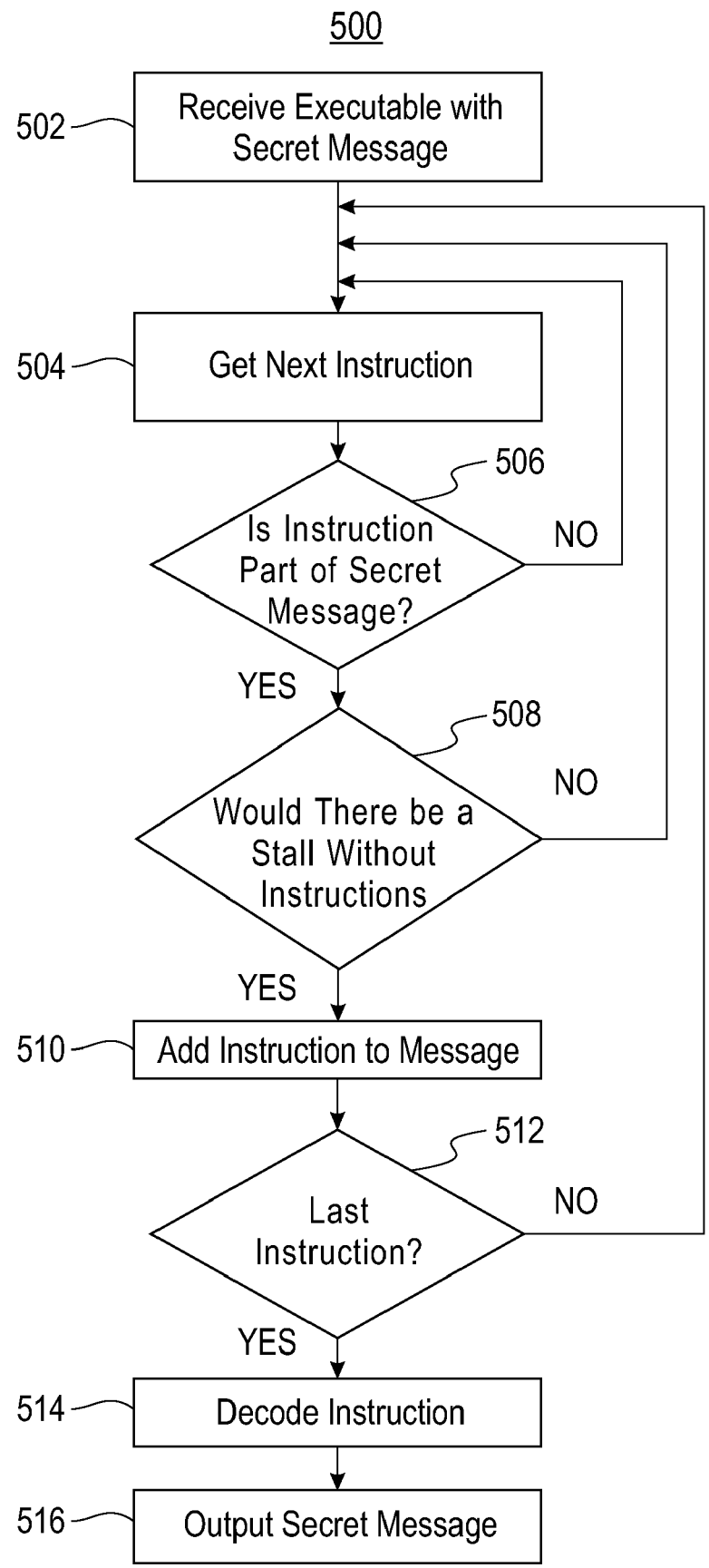
FIG. 5 shows a flow chart of a method of extracting a message from executable code in accordance with an embodiment of the invention.

FIG. 5 shows a flow chart of a process 500 for extracting a message in executable code in accordance with one embodiment of the invention. In step 502 the executable code containing the embedded secret encoded message is received, for example, by the message extractor 404. In step 504 the first and subsequent instructions are selected one at a time. Step 506 determines if the selected instruction is an instruction that represents bits of the secret message. This may be done for example, by determining if the instruction corresponds to information given in the code book. If it is not, the process returns to step 504 and the next instruction is selected.

If step 506 determines that the instruction represents bits of the secret message, the process may optionally moves to step 508, which may perform data dependency analysis. For example this step may involve a check to determine if the removal of an identified instruction would result in a pipeline stall. If removal would result in pipeline stall there is a greater degree of certainty that the instruction contains parts of the secret message. In some embodiments, step 508 may be skipped; however, there is a greater chance of extraneous bits being included with the secret message. In step 510 the instruction is added to the secret message. Step 512 then determines if the last instruction has been analyzed. If not, the process returns to step 504 and the next instruction is selected. Once all the instructions have been processed then step 514 decodes the message using information from the code book. The decided message is then output for reading in step 516.

In addition to using the present invention for secret communication or for watermarking/fingerprinting, the present invention can also be used for encoding a digital signature of executable code. This can be done by computing the signature with the nop instruction in place and encoding the signature in the executable. One way to verify the signature is to extract the signature from the code, replace the message contributing instructions with nop instructions, compute the signature for the executable, and verify. For fixed length instruction sets this has the advantage of digital signature protection without an increase in executable size.

In accordance with the present invention, we have disclosed systems and methods for encoding information in an instruction processing pipeline. Those of ordinary skill in the art will appreciate that the teachings contained herein can be implemented in many applications in addition to those discussed above where there is a need for secret communication, watermarking, fingerprinting and digital signatures. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No clam element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

I claim:

1. A method for embedding information as a hidden message in a computer program comprising:
   performing data dependency analysis on said computer program to identify locations within said computer program where pipeline processing dependencies require a stall;
   scanning said locations of said stall to find no-operation instructions that are already part of said computer program;
   selecting said no-operation instruction on a particular execution path in a pipeline;
   selecting said no-operation instruction in an order that it appears in said pipeline;
   encoding said information;
   replacing the no-operation instruction, already part of said computer program and found by said scanning said locations, in said locations with a new instruction;
   wherein said new instruction contains at least a portion of said information by:
      dividing said information into a plurality of consecutive sections; and
      replacing the no-operation instruction with said new instruction containing said plurality of consecutive sections non-consecutively into said locations within said computer program;
   wherein said new instruction does not alter a functionality of said computer program; and
   wherein said new instruction performs an operation and a subsequent new instruction is inserted to undo said operation; and
   detecting said hidden message by performing data dependency analysis on said pipeline, which comprises:
      decoding said new instruction to its corresponding bit in said hidden message when removal of said new instruction from said pipeline results in said stall in said pipeline; and
      ignoring said new instruction when the removal of said new instruction from said pipeline does not result in said stall in said pipeline.

* * * * *